A. J. MITCHELL.
GEARING.
APPLICATION FILED MAR. 28, 1917.
1,239,804.
Patented Sept. 11, 1917.
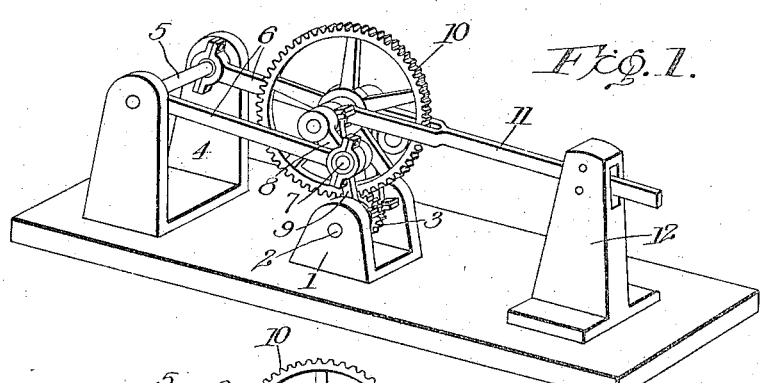
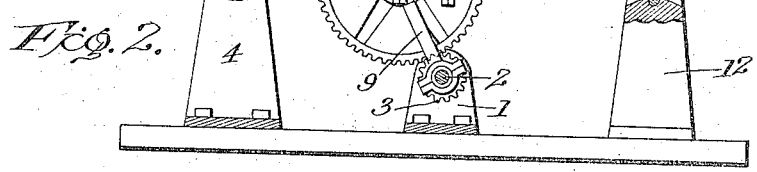
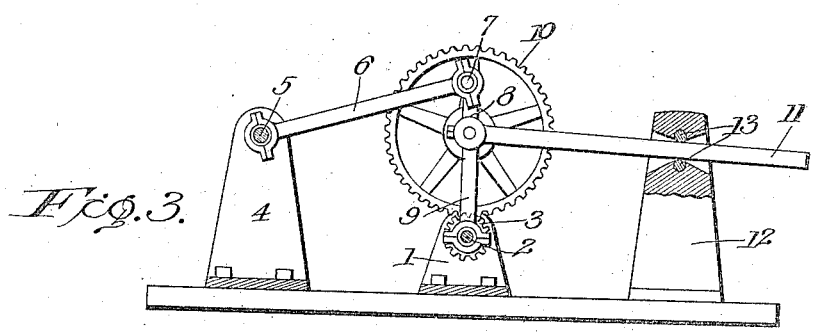
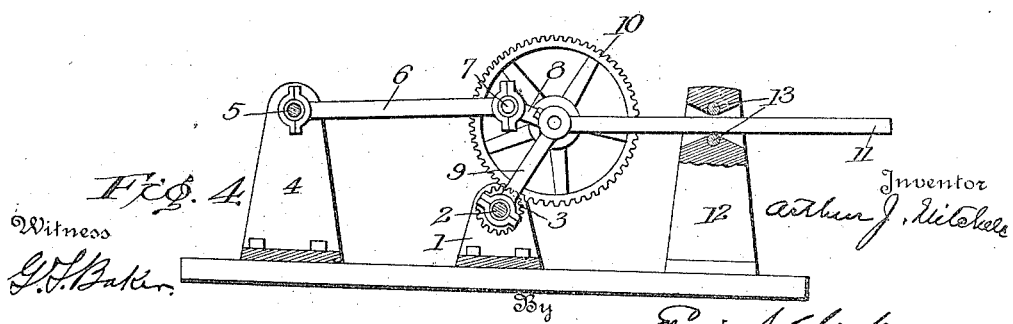

UNITED STATES PATENT OFFICE.

ARTHUR J. MITCHELL, OF CONNERSVILLE, INDIANA.

GEARING.

1,239,804. Specification of Letters Patent. Patented Sept. 11, 1917.

Application filed March 28, 1917. Serial No. 157,963.

*To all whom it may concern:*

Be it known that I, ARTHUR J. MITCHELL, a citizen of the United States, residing at Connersville, in the county of Fayette and State of Indiana, have invented certain new and useful Improvements in Gearing, of which the following is a specification.

In many types of machines, such for instance as windmill pumps, hay presses or balers and automatic machinery it is desirable to have the operating part, such for instance as a pitman, positively driven in both directions with a slow motion one way and a quick return.

The object of my invention is to provide a gearing which will positively drive a pitman, and the like, positively in both directions with a slow motion one way and a quick return. A further object of my invention is to provide a gearing of the character that can be readily installed with machinery now in use.

A still further object of my invention is to provide such a gearing which comprises intermeshing gears, belts, chains or friction drivers.

A further object of my invention is to provide a gearing of this character including two shafts, one being movable relatively to the other, means to maintain shafts parallel with each other and an operative driving connection between said shafts, one of said shafts being connected to a pitman whereby the pitman is positively driven in both directions with a slow motion one way and a quick return; and with these and other objects in view my invention consists of the parts and combination of parts as hereinafter pointed out.

In the drawings:—

Figure 1 is a perspective view of my improved gearing.

Figs. 2, 3, and 4 are side elevations of Fig. 1 showing the parts in different positions.

The reference numeral 1 designates a pair of fixed bearings in which is journaled a shaft 2, on which is keyed a pinion 3. Another pair of fixed bearings 4 is positioned to the rear of the bearings 1, in which is mounted a rod 5, to which one end each of a pair of arms 6 is loosely connected whereby the free ends of the arms are free to oscillate.

A shaft 7 is pivotally mounted on the free ends of the arms 6 and is provided with a crank 8 intermediate its ends. The shafts 2 and 7 are connected by links 9 whereby they are maintained in parallel relation at all times; one end of each link being loosely mounted on the shaft 2, on each side of the pinion 3, while the other end of said links is connected to the crank 8.

A gear wheel 10 is revolubly mounted on the crank 8 between the links and intermeshes with the pinion 3 on shaft 2. A pitman 11 is connected at one end to the crank 8 of the shaft 7 while the other end of the pitman may be connected to a pump, hay press or baler, or other automatic machinery, said pitman, preferably, having an intermediate bearing 12 in which are mounted anti-friction rollers 13 on which the pitman is directly mounted.

At all points of bearing of the shafts, arms, and pitman I provide suitable packed journal boxes to reduce friction as much as is possible.

When the pitman is at the end of its return stroke the parts are in the position shown in Fig. 2, in which position the crank 8 and the arms 6 are in a horizontal plane, the links 9 are inclined to the rear of the shaft 2 and the hub of the gear wheel 10 is to the rear of the shaft 2. When the shaft 2 revolves in the direction of the arrow the pinion 3 revolves the gear wheel 10, whereby the crank 9 is moved downward, and the arms 6 upward whereby the gear wheel moves bodily forward and continues so to move until the crank 9 is again in a substantially horizontal plane 180° from its starting point, and the hub of the gear wheel is now to the front of the shaft 2 as shown in Fig. 3. During this movement of the crank through 180° the pitman 11 has been positively moved forward with a slow motion. A continued revolution of the shaft 2 causes, through the pinion and gear wheel, the crank 9 to move upwardly and rearwardly through 180° to the point of beginning and during this latter movement of the crank the pitman is moved backward with a quick return. In the return movement when the crank has moved through 270° the parts assume the position shown in Fig. 4, the crank being in a vertical plane, while the hub of the gear wheel is over the pinion 3 and substantially in the same vertical plane as the shaft 2, and the free ends of the arms 6 are below the horizontal.

From the above it will be seen that during the operation just above stated the gear wheel moves bodily with the pitman and crank and relatively to the pinion 3.

While I have selected the embodiment shown in the drawing for the purpose of illustrating my invention it will be understood that I may use other embodiments for the purpose of carrying out my invention within the scope of the claims.

What I claim is:—

1. In a gearing the combination with a shaft mounted in fixed bearings, and a pinion keyed to said shaft, of a shaft mounted in reciprocating bearings, means to hold the two shafts in fixed spaced relation, a gear wheel revolubly mounted on said second shaft whereby the gear wheel may shift bodily relatively to the pinion in plane at right angles to the pinion shaft.

2. A structure as specified in claim 1 in which the shaft of the gear wheel is a crank shaft and the gear wheel is mounted on said crank.

3. A gearing as specified in claim 2 in which the crank shaft is connected to the pinion shaft by links whereby the two shafts are maintained in parallel relation.

4. In a gearing the combination with a shaft mounted in fixed bearings, a pinion keyed to said shaft, a fixed support, arms pivotally mounted at one end of a fixed support, a shaft journaled on the free ends of said arms, a gear revolubly mounted on said last named shaft and adapted to mesh with said pinion, and means to hold the gear and pinion in operative relation, whereby said gear wheel may move bodily at right angles to the pinion shaft and maintain its mesh with said pinion, whereby a quick return movement is imparted to said gear wheel shaft.

5. In a gearing the combination with a shaft mounted in fixed bearings, a pinion keyed to said shaft, arms pivotally mounted at one end on a fixed bearing, whereby the free ends of said arms are free to move, a crank shaft revolubly mounted on the free ends of said arms, links connecting the two said shafts to maintain the shafts parallel with each other, a gear wheel revolubly mounted on said crank shaft and constructed to mesh with said pinion, a pitman connected to said crank shaft; whereby said gear wheel may shift bodily at right angles to the pinion shaft and at the same time remain in mesh with said pinion, whereby said pitman is positively driven in each direction with a slow motion one way and a quick return.

6. In a gearing the combination of a shaft mounted in fixed bearings, a pinion keyed to said shaft, arms pivotally mounted at one end, a crank shaft revolubly mounted on the free ends of said arms with the crank disposed between said arms, links connecting the crank portion of the crank shaft with the pinion shaft to maintain the two shafts parallel, a gear wheel revolubly mounted on said crank shaft, and free to move bodily with the crank at right angles to the pinion shaft and maintain operative connection with the pinion, a pitman connected to said crank shaft; whereby said pitman is positively driven in both directions with a slow motion one way and a quick return.

7. In a gearing the combination of a shaft mounted in fixed bearings, arms pivotally mounted at one end, a shaft mounted on the free ends of said arms, whereby it may move bodily relatively to the first named shaft, and operative driving connection between said shafts, means to hold the two shafts in spaced relation, a pitman connected to the movable shaft, whereby the pitman is positively driven in each direction with a slow movement one way and a quick return.

In testimony whereof I affix my signature in the presence of two witnesses.

ARTHUR J. MITCHELL.

Witnesses:
GLADYS CROUSE,
FLORENCE MITCHELL.